(12) United States Patent
Maresh et al.

(10) Patent No.: US 11,745,853 B2
(45) Date of Patent: Sep. 5, 2023

(54) SINGLE HOOKE'S JOINT WITH SPHERICAL MAST ATTACHMENT

(71) Applicant: Bell Textron Inc., Fort Worth, TX (US)

(72) Inventors: Andrew Ryan Maresh, Colleyville, TX (US); Kyle Thomas Cravener, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 420 days.

(21) Appl. No.: 16/821,266

(22) Filed: Mar. 17, 2020

(65) Prior Publication Data

US 2021/0291960 A1 Sep. 23, 2021

(51) Int. Cl.
*B64C 11/02* (2006.01)
*B64C 27/35* (2006.01)
*B64C 29/00* (2006.01)
*B64C 11/28* (2006.01)
*F16D 3/26* (2006.01)

(52) U.S. Cl.
CPC ............. *B64C 11/02* (2013.01); *B64C 11/28* (2013.01); *B64C 27/35* (2013.01); *B64C 29/0033* (2013.01); *F16D 3/26* (2013.01)

(58) Field of Classification Search
CPC ......... B64C 11/02; B64C 11/28; B64C 27/35; B64C 29/0033; B64C 11/04; B64C 27/32; B64C 27/37; B64C 27/41; B64C 27/50; B64C 29/0003; F16D 3/26; F16D 3/41
See application file for complete search history.

(56) References Cited

U.S. PATENT DOCUMENTS

| 8,226,355 | B2 * | 7/2012 | Stamps | B64C 27/32 416/103 |
| 10,766,612 | B2 * | 9/2020 | Rauber | B64C 27/14 |
| 2003/0222171 | A1 * | 12/2003 | Zoppitelli | F16D 3/70 244/10 |
| 2014/0248150 | A1 * | 9/2014 | Sutton | F16D 3/33 464/134 |
| 2015/0053814 | A1 * | 2/2015 | Stamps | F16D 3/42 244/17.11 |
| 2016/0023752 | A1 * | 1/2016 | Foskey | B64C 27/48 464/157 |
| 2018/0037318 | A1 * | 2/2018 | Day | B64C 29/0033 |
| 2018/0273160 | A1 * | 9/2018 | Baldwin | B64C 27/605 |

* cited by examiner

*Primary Examiner* — Joshua J Michener
*Assistant Examiner* — Cindi M Curry
(74) *Attorney, Agent, or Firm* — Fogarty LLP

(57) ABSTRACT

Embodiments are directed to a rotor hub assembly comprising a yoke configured to attach rotor blades thereto, a single Hooke's joint configured to attach to, and transmit forces between, a mast and the yoke, and a spherical bearing coupled between the yoke and the mast. Two pillow blocks couple the single Hooke's joint to the yoke. An adapter sleeve is attached to the pillow blocks and is positioned to surround the spherical bearing. The adapter sleeve extends between the single Hooke's joint and the mast. A hub lock extension is attached to the yoke. The hub lock extension is configured to receive a hub lock that prevents gimballing of the yoke when engaged.

18 Claims, 8 Drawing Sheets

SINGLE HOOKE'S JOINT WITH SPHERICAL MAST ATTACHMENT

BACKGROUND

Vertical takeoff and landing (VTOL) aircraft are capable of taking off, hovering, and landing vertically. Examples of VTOL aircraft include helicopters and tiltrotor aircraft, which have one or more rotors that provide lift and thrust to the aircraft. The rotors not only enable hovering and vertical takeoff and landing, but also enable forward, backward and lateral flight. There are many rotor assembly configurations that allow for rotor blade movement during operation. VTOL often utilize a gimbaled drive joint to allow the axis of rotation of the rotor hub to vary relative to the mast axis. These gimbaled drive joints may utilize universal joints to accomplish the variable axis of rotation. Helicopters and tiltrotors may, for example, use a gimbaled proprotor hub that allows the entire hub to tilt relative to a mast during flapping while the rotor blades remain in a fixed in-plane orientation relative to the hub. VTOL aircraft may include gimbal lock devices to prevent hubs from flapping.

The forces in the rotor blades are primarily periodic components of the rotor's rotational rate and its harmonics. One-per-revolution or "1P" loads are forces at the rotor's rotational rate. Harmonics are multiples of this 1P load, such as the second, third, and fourth harmonics (i.e., 2P, 3P, 4P, and so on). These harmonics are important contributors to the vibrations of a VTOL aircraft. Rotor blade vibratory forces are due to asymmetric loading of the rotor blades in forward flight, which causes the rotor blades to experience a constantly changing airflow. This causes a periodic variation of the rotor blade angle of attack. These varying air loads cause the blades to vibrate. The vibration loads in the rotor blades are transferred to the hub and then to the mast thereby causing wear in the entire rotor structure.

SUMMARY

Embodiments are directed to a rotor hub assembly comprising a yoke configured to attach rotor blades thereto, a single Hooke's joint configured to attach to, and transmit forces between, a mast and the yoke, and a spherical bearing coupled between the yoke and the mast. Two pillow blocks couple the single Hooke's joint to the yoke. An adapter sleeve is attached to the pillow blocks and is positioned to surround the spherical bearing. The adapter sleeve extends between the single Hooke's joint and the mast. The adapter sleeve and pillow blocks may be a single component or may be separate components that are connected together. A hub lock extension is attached to the yoke. The hub lock extension is configured to receive a hub lock that prevents gimballing of the yoke when engaged. The hub lock extension and pillow blocks may be a single component or may be separate components that are connected together.

The rotor hub assembly may further comprise a pair of pillow blocks attached to the yoke, a first pair of trunnions on the single Hooke's joint, the first pair of trunnions coupled to the pillow blocks, a mast driver attached to the mast, the mast driver having two arms, and a second pair of trunnions on the single Hooke's joint, the second pair of trunnions coupled to the arms on the mast driver. Bearings are coupled between each trunnion and the corresponding pillow block or mast driver arm. An adapter sleeve is attached to the pillow blocks and positioned to surround the spherical bearing. The adapter sleeve extends between the single Hooke's joint and the mast. A hub lock extension is attached to the yoke. The hub lock extension is configured to receive a hub lock that prevents gimballing of the yoke when the hub lock is engaged. The adapter sleeve, pillow blocks, and hub lock extension may be individual components that are attached together or two or more of these elements may be a single component.

In another embodiment, a tiltrotor aircraft comprises a fuselage, a wing having a first end attached to the fuselage, and a rotor system coupled to a second end of the wing. The rotor system is configured to move between a vertical orientation and a horizontal orientation during operation. The rotor system comprises a yoke configured to attach a plurality of rotor blades thereto, a single Hooke's joint configured to attach to, and transmit forces between, a mast and the yoke, and a spherical bearing coupled between the yoke and the mast. A pair of pillow blocks are attached to the yoke. A first pair of trunnions on the single Hooke's joint are coupled to the pillow blocks. A mast driver is attached to the mast. The mast driver has two arms, and a second pair of trunnions on the single Hooke's joint are coupled to the arms on the mast driver. An adapter sleeve is attached to the pillow blocks and positioned to surround the spherical bearing. The adapter sleeve extends between the single Hooke's joint and the mast.

A hub lock extension is attached to the yoke. The hub lock extension is configured to receive a hub lock that prevents gimballing of the yoke when the hub lock is engaged. The rotor blades are configured to move between an extended position and a folded position while operating in the horizontal orientation and with the hub lock engaged. The spherical bearing is configured to transfer shear loads from the yoke to the mast when the hub lock is engaged and when gimballing forces are applied to one or more of the rotor blades.

BRIEF DESCRIPTION OF THE DRAWINGS

Figure 1A:
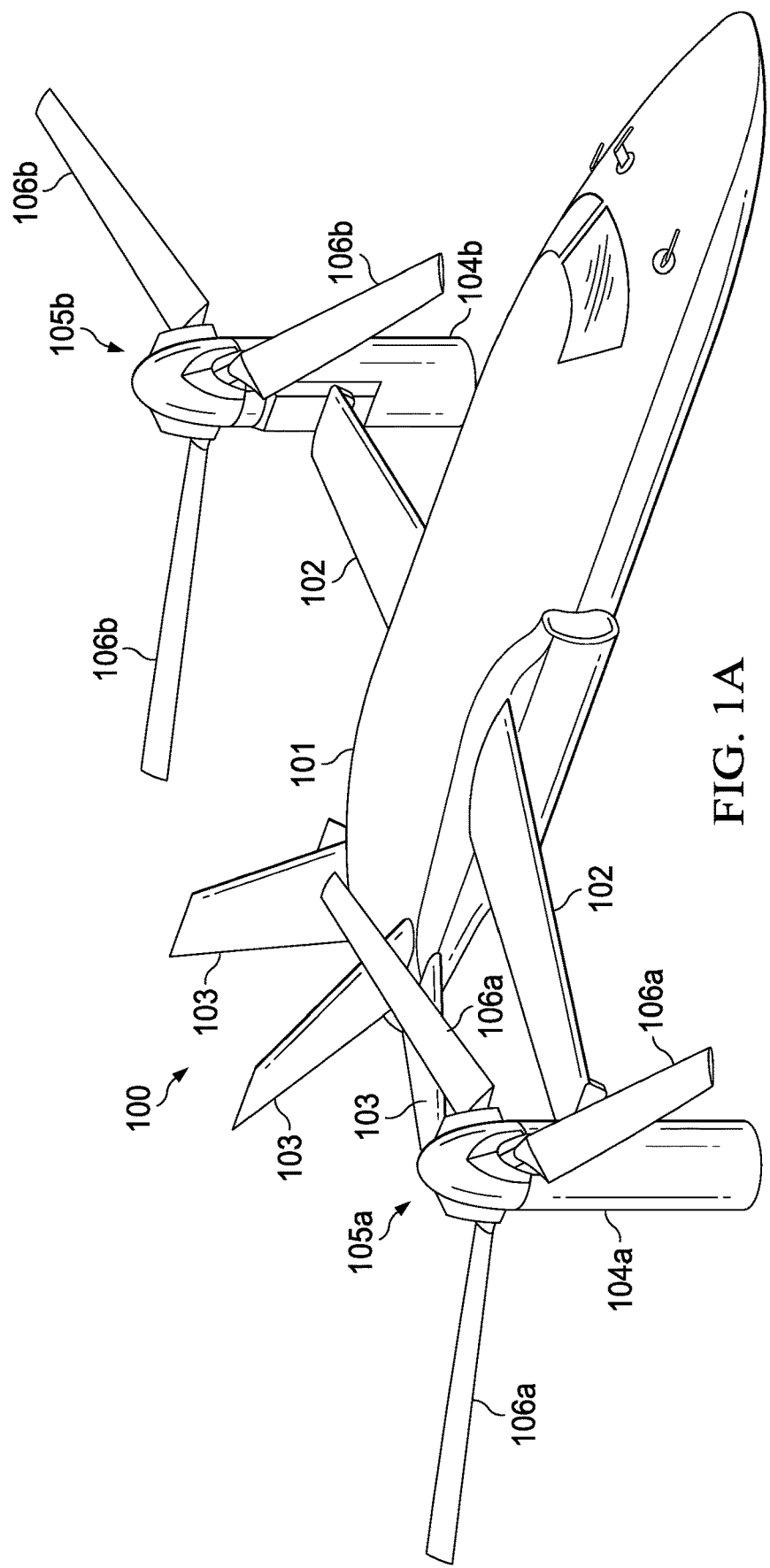
Figure 1B:
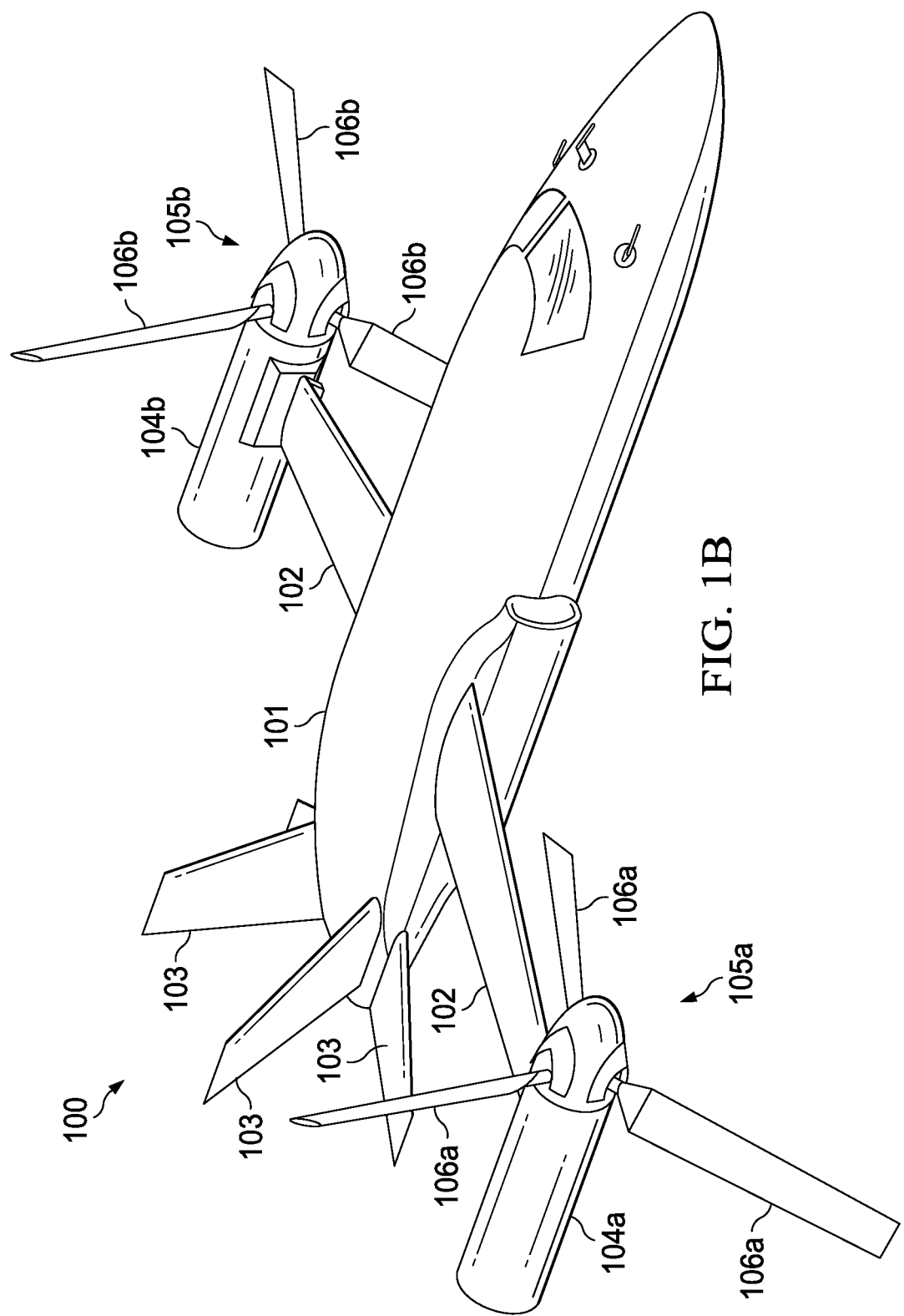
Figure 1C:
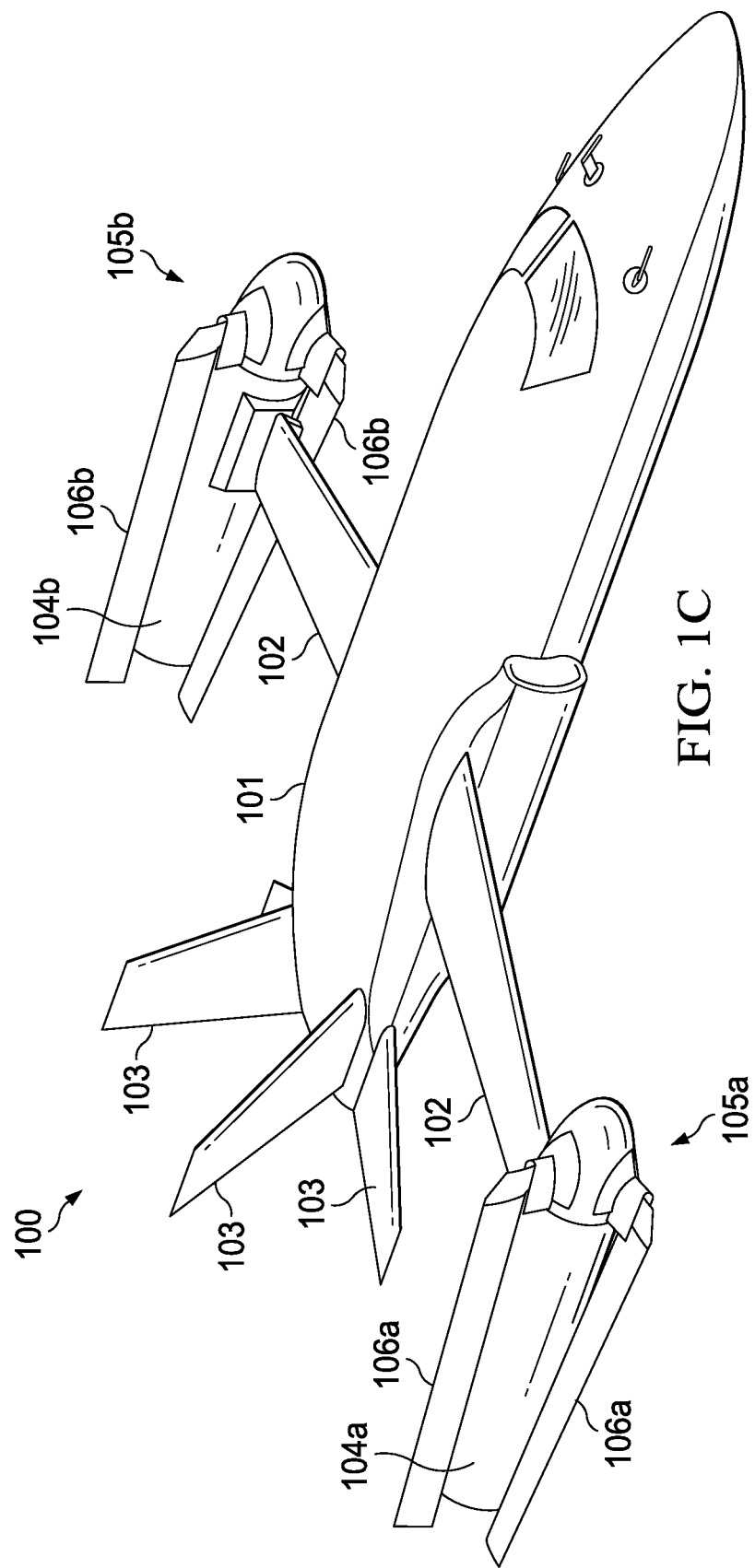

Having thus described the invention in general terms, reference will now be made to the accompanying drawings, which are not necessarily drawn to scale, and wherein:

FIGS. 1A-1C illustrate a tiltrotor aircraft in various flight modes, including helicopter, airplane, and jet/fold-stop modes.

Figure 2A:
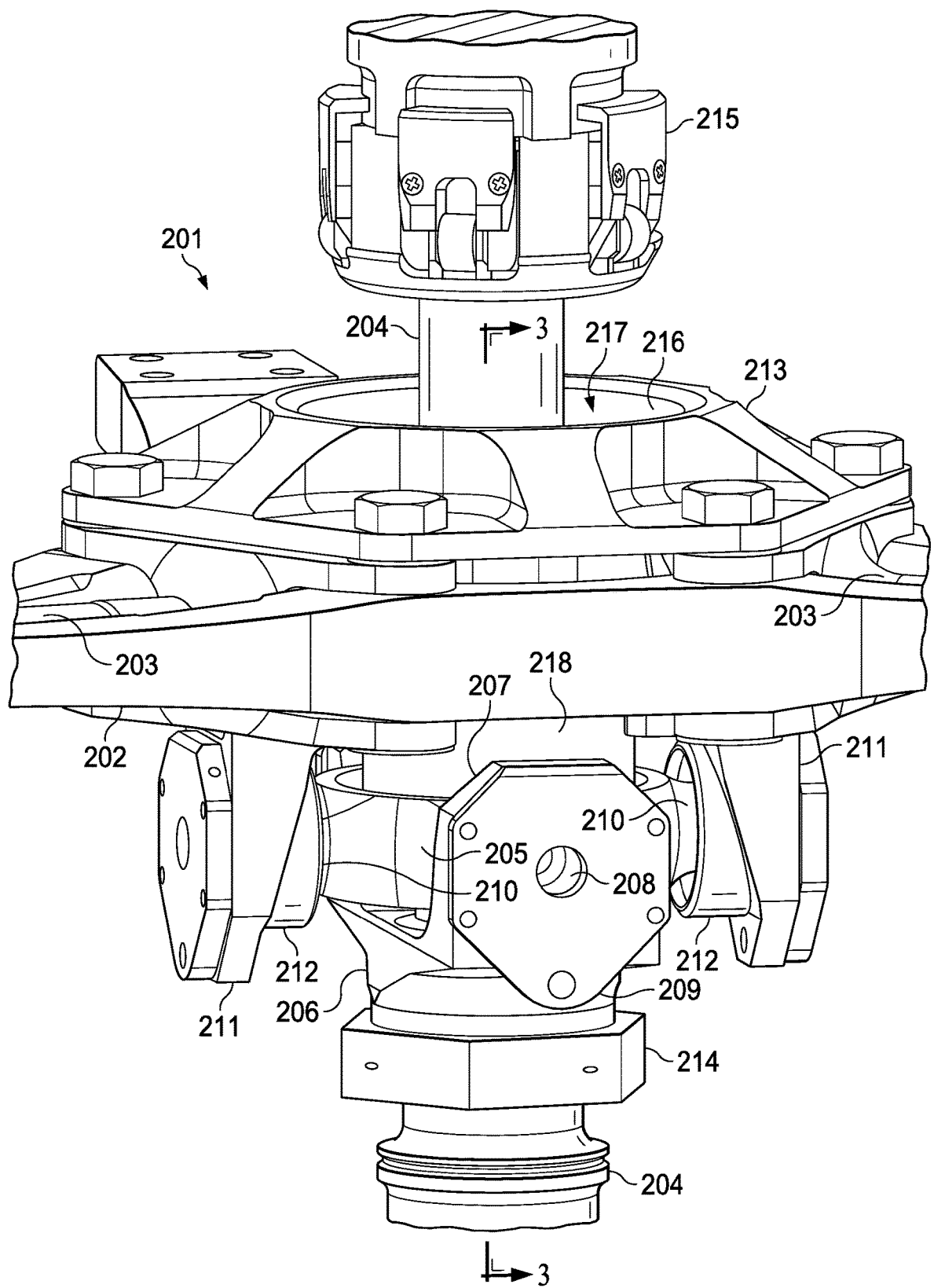
Figure 2B:
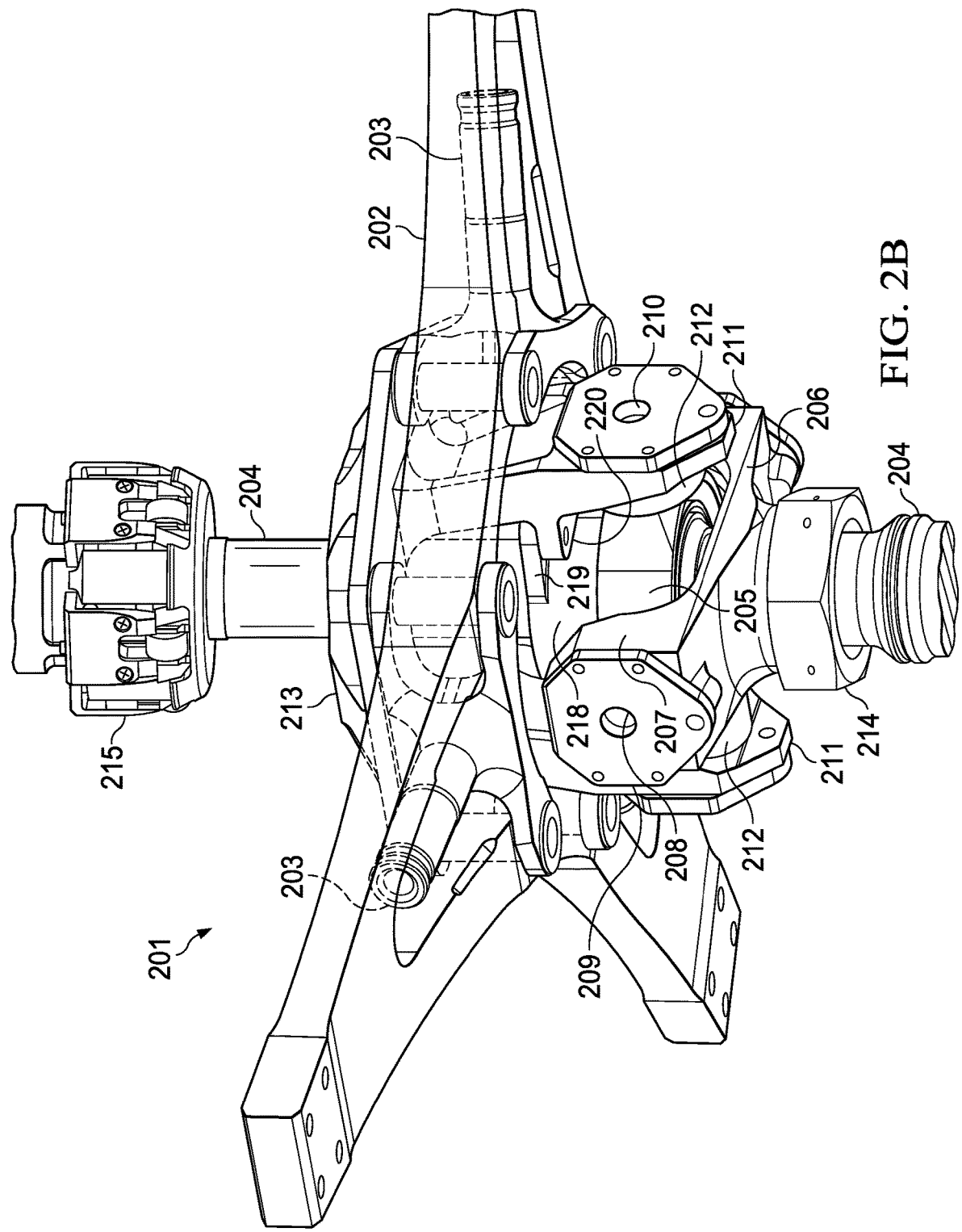

FIGS. 2A and 2B are a top and bottom perspective views of a hub assembly according to an example embodiment.

Figure 3:
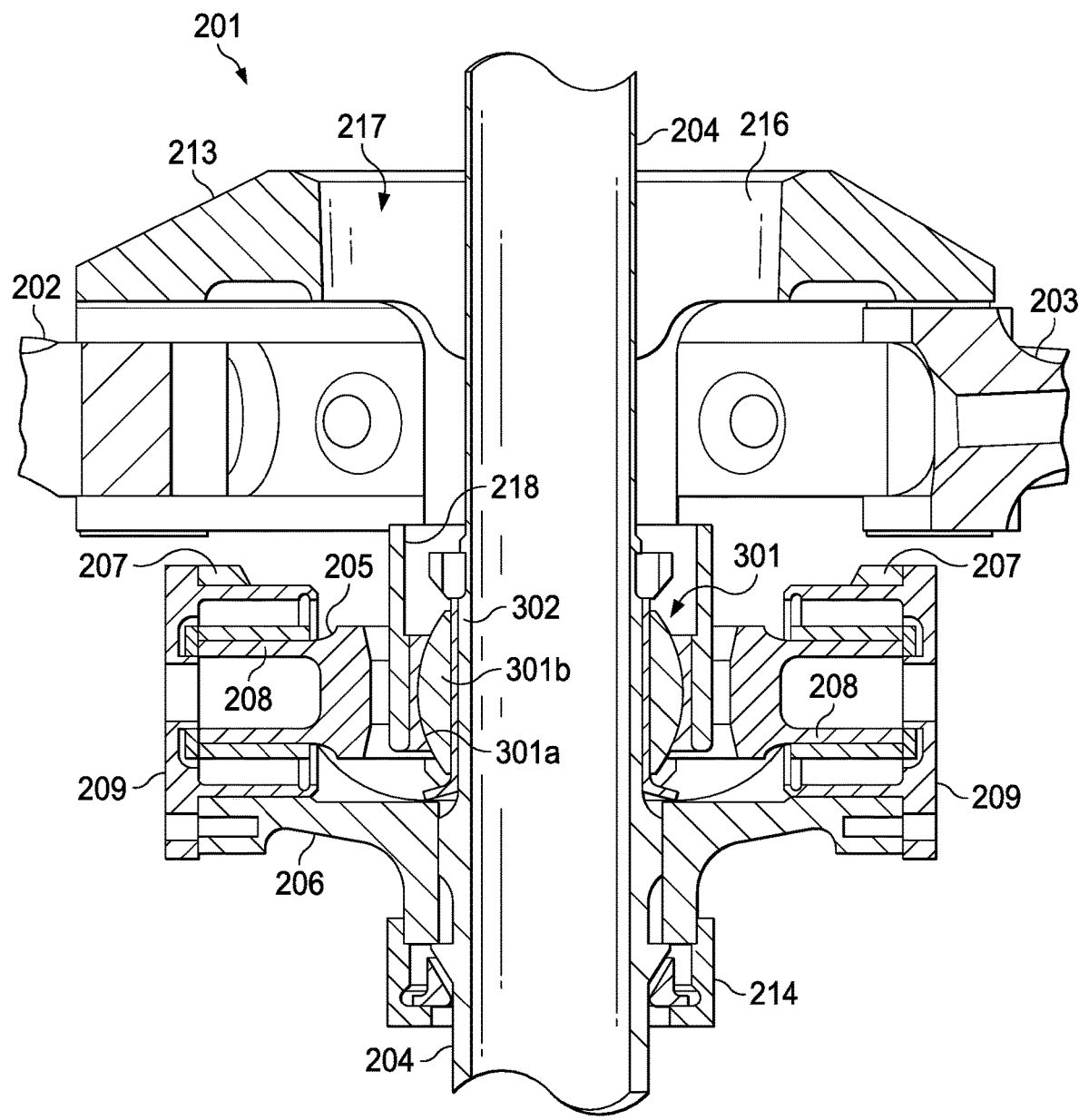

FIG. 3 is a cross-section view of the hub assembly of FIGS. 2A and 2B showing the use of a spherical bearing in a single Hooke's joint gimbal system.

Figure 4:
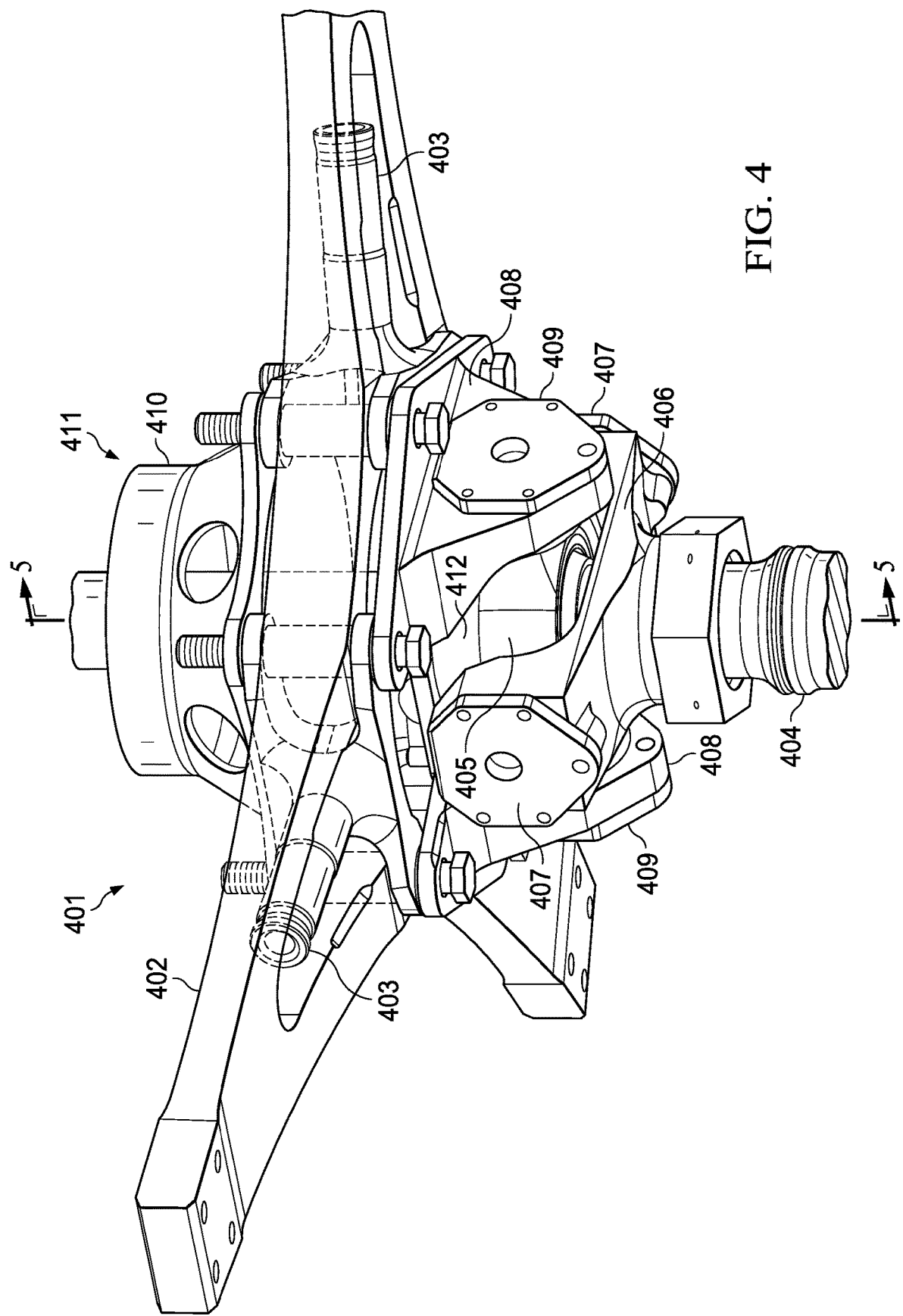

FIG. 4 is a perspective views of a hub assembly according to an alternative embodiment.

Figure 5:
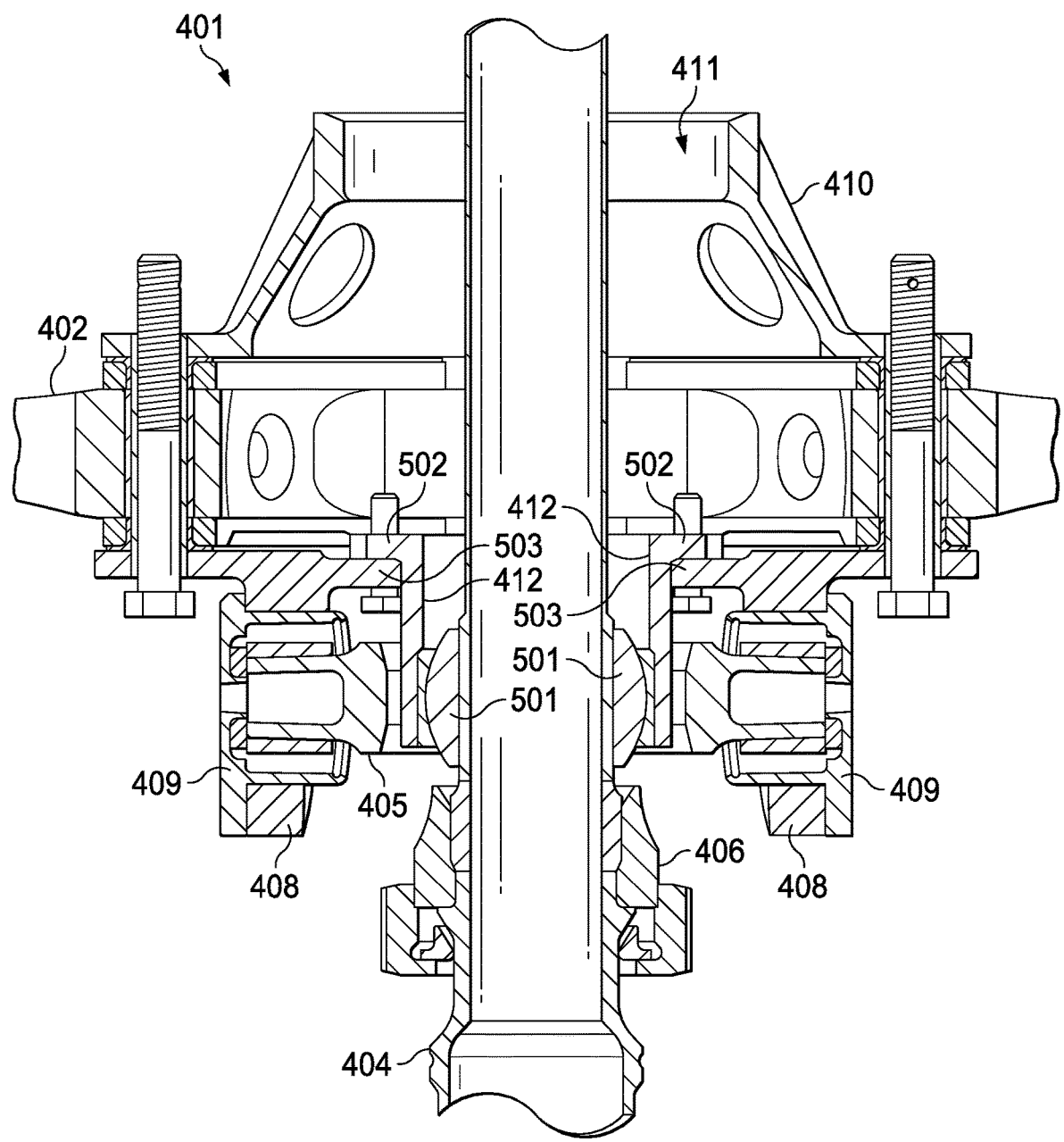

FIG. 5 is a cross-section view of the hub assembly of FIG. 4 showing the use of a spherical bearing in an alternative gimbal system.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C, a tiltrotor aircraft is schematically illustrated and generally designated 100. Aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B and 1C. The entire pylon assembly 104a, 104b may rotate relative to wing 102, as illustrated in FIGS. 1A-1C. In other embodiments, pylon assemblies 104a, 104b may comprise a fixed portion that is attached to wing 102 and a moveable portion that rotates or pivots relative to wing 102.

Pylon assemblies 104a, 104b each house a portion of a drive system that is used to rotate proprotor assemblies 105a, 105b, respectively. The drive system may comprise, for example, engines within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded.

FIG. 1A illustrates aircraft 100 in VTOL or helicopter flight mode, in which pylons 104a, 104b are configured in a vertical position and proprotor blades 106a, 106b rotate in a substantially horizontal plane to provide a lifting thrust, such that aircraft 100 flies much like a conventional helicopter.

FIG. 1B illustrates aircraft 100 in a forward-flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that aircraft 100 flies much like a conventional propeller driven aircraft.

In the rotary flight modes, proprotor assemblies 105a, 105b rotate in opposite directions to provide torque balancing to aircraft 100. For example, when viewed from the front of aircraft 100 in proprotor forward-flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that aircraft 100 can be operated such that proprotor assemblies 105a, 105b are selectively positioned between proprotor forward-flight mode and helicopter mode, which can be referred to as a conversion flight mode.

While in the configuration illustrated in FIG. 1B, aircraft 100 may transition between a proprotor-driven forward-flight mode and a thrust-driven forward-flight mode or jet mode. A thrust engine (not shown) in fuselage 101 is engaged and jet thrust initially supplements the proprotor assemblies 105a, 105b. Then proprotor assemblies 105a, 105b are disengaged from their power source, such as the thrust engine or a separate lift engine in fuselage 101. The proprotor blades 106a, 106b of proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates aircraft 100 in a jet mode, in which proprotor blades 106a, 106b of proprotor assemblies 105a, 105b have been folded to be oriented substantially parallel to respective pylon assemblies 104a, 104b. This configuration minimizes the drag force generated by proprotor blades 106b, 106c. The forward cruising speed of aircraft 100 can be significantly higher in a jet mode versus proprotor flight mode by reducing any airspeed-induced proprotor aeroelastic instability. In this configuration, the thrust engine provides forward thrust for aircraft 100, thereby enabling wings 102 to provide a lifting force responsive to the forward airspeed. In VTOL mode, proprotor assemblies 105a, 105b allow for flapping of proprotor blades 106a, 106b; however, before folding rotorblades 106a, 106b for jet mode, the proprotor assemblies 105a, 105b are locked in order to prevent flapping while folding the rotor blades. Apparatus for folding rotor blades on a stop-fold aircraft are disclosed, for example, in U.S. Pat. No. 8,998,125 B2, U.S. Pat. No. 10,336,447 B2, and U.S. Pat. No. 10,526,068 B2, the disclosures of which are hereby incorporated herein by reference in their entirety.

Aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the engine may again engage proprotor assemblies 105a, 105b. When torque power is applied to rotate proprotor blades 106a, 106b, aircraft 100 enters proprotor forward-flight mode. Aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

It will be understood by those having ordinary skill in the art that other engine arrangements are possible and are considered to be within the scope of the present disclosure.

For example, in an alternative embodiment, aircraft 100 may have multiple lift engines that provide torque and rotational energy separately to each proprotor assembly 105a and 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations.

Designs of rotors and propellers for tiltrotor aircraft are often extremely complex. A large number of factors must be considered, including flexure of the rotor under heavy loads and the required motions of the rotor blades with respect to the drive mechanism. The considerations for proprotors, used as both propellers and rotors in aircraft, such as tiltrotor aircraft 100, can be more complex than usual. Gimbaled rotors may be used in such aircraft. In a gimbaled rotor, joints must be provided between a driveshaft or mast that carries torque from the engine and the yoke that drives the blades, giving rise to a relatively complex hub assembly.

FIG. 2A is a perspective view of the top of hub assembly 201, which may be part of a proprotor assembly, such as proprotor assemblies 105a, 105b shown in FIGS. 1A-1C. FIG. 2B is a perspective view of the bottom of hub assembly 201. Hub assembly 201 comprises a yoke 202 having three arms to which rotor blades can be coupled using spindles 203. Mast 204 is coupled to a transmission (not shown), such as a main rotor gearbox, that is in turn coupled to an engine (not shown). Engine torque causes mast 204 to rotate, which in turn rotates hub assembly 201, yoke 202, and rotor blades attached to spindles 203. Mast 204 transmits torque from the engine to hub assembly 201 using a Hooke's joint 205 that allows for hub assembly 201 flapping. Hooke's joint 205 is an annulus-shaped structure having two pairs of trunnions 208, 210 that extend outwardly from the annulus in an X shape. Hooke's joint 205 has a hollow open center portion that is adapted to fit round mast 204 with sufficient room to allow Hooke's joint 205 to flap or tilt relative to mast 204.

A driver member 206 is coupled to mast 204 using, for example, spline 214. Drive member 206 has two arms 207 that are configured to accept a first set of trunnions 208 that are positioned on opposite sides of Hooke's joint 205. Bearings 209 are positioned between trunnions 208 and arms 207 to allow Hooke's joint 205 to rotate. Hooke's joint 205 has a second set of trunnions 210 that are coupled to pillow blocks 211 by bearings 212. Bearings 209 and 212 transfer loads from a hub extension 213 to mast 204 during flapping of hub assembly 201. Bearings 209 and 212 may comprise, for example, radial needle bearings and/or axial thrust needle bearings.

Hub extension 213 comprises pillow blocks 211 and provides a structure for mounting yoke 202 and spindles 203. Rotation of mast 204 causes rotation of drive member 206, which in turn rotates Hooke's joint 205, hub extension 213, and yoke 202. With a gimballed hub assembly 201, flapping primarily occurs by tilting/gimbaling the hub/yoke 202. The rotor blades follow movement of the yoke 202. The rotor blades may also deflect up/down, which is generally referred to as positive/negative coning. Blade flapping occurs when the rotor blade is not rotating normal to the axis of the mast 204. This may be accomplished with independent blade flapping hinges, a teetering hub, or a gimballed hub assembly 201. Blade flapping/coning occurs when an aerodynamic force is exerted on the rotor blade to move it out of a plane normal to the axis of rotation (i.e. the axis of mast 204). For example, changing the pitch of the rotor blades to incur aerodynamic forces may create flapping.

A gimbal lock 215 may be engaged with hub extension 213 to prevent flapping of hub assembly 201. Gimbal lock 215 is configured to slide up and down along mast 204. The inner wall 216 of hub extension 213 and mast 204 form an annular space or opening 217 surrounding mast 204. Annular space 217 in hub extension 213 forms an opening that is adapted to receive gimbal lock 215. The inner wall 216 of hub extension 213 and the outer surface of gimbal lock 215 may have a slight taper, such as less than two degrees pitch, to help guide gimbal lock 215 into space 217. This also ensures that gimbal lock 215 can securely fit into space 217 with minimal excess space for hub assembly 201 to flap once gimbal lock 215 is engaged. When gimbal lock 215 is lowered into space 217 to prevent flapping, the hub assembly 201 is still capable of rotating with mast 204.

While gimbal lock 215 is in the raised position as illustrated in FIGS. 2A and 2B, hub assembly 201 may be tilted in a variety of directions relative to mast 204 due to flapping. Moving hub assembly 201 relative to mast 204 changes the angular relationship between hub assembly 201 and mast 204. This angle may vary during operation. Hooke's joint 205 couples mast 204 to hub assembly 201 in such a way that torque may be transmitted while maintaining a substantially constant angular velocity throughout a full rotation of the mast 204 and the rotor blades coupled to yoke 202. Such rotation generates proprotor thrust by the rotor blade assembly. This proprotor thrust may be used to lift an aircraft in helicopter mode (e.g., FIG. 1A) or to drive the aircraft forward in airplane mode (e.g., FIG. 1B). When the rotor blades are stopped and folded ("stop-fold"), the gimbal lock assembly 215 is moved to a lowered position to lock hub assembly 201 in position and to prevent flapping, such as when the rotor blades are to be folded.

There is a tendency in a single Hooke's joint gimbal system for foreshortening in which the gimbal components either lengthen or shorten during every rotation. This foreshortening is compounded with flapping of the hub assembly. As flapping increases, the 2P vibration also increases and is passed to the airframe. When a single Hooke's joint, such as hub assembly 201, operates in VTOL and airplane mode, which are the traditional tilt-rotor modes, the only bearings that get loaded are four sets of needle bearings 209 and 212. During rotation, one set of bearings 209 or 212 passes the mast 204 torque off to the other set of bearings 212 or 209 and then eventually to the yoke 202. Bearings 209 and 212 also take all of the thrust load.

As illustrated in FIG. 1C, a tiltrotor aircraft may also have a jet mode. While operating in jet mode, hub lock 215 is used to lock hub assembly 201 to prevent flapping, which is required to allow for folding of the rotor blades 106a, 106b. However, when hub assembly 201 is locked and the rotor blades are still extended (whether or not they are still rotating), the proprotor assembly can experience gusts or other forces that attempt to tilt or flap the hub assembly 201. This creates a shear couple to the mast 204 that acts solely through one of the bearings 209 or 212, which effectively creates a flapping hinge on the mast 204 at the affected bearings 209, 212. This bending creates a high degree of loading the affected bearing, which will cause the bearing to wear out or fail quickly.

FIG. 3 is a cross-section view of hub assembly 201. A spherical bearing 301 in the middle of Hooke's joint 205 couples hub assembly 201 directly to mast 204. This provides a direct path to mast 204 if shear loads are applied when hub assembly 201 is locked out to prevent flapping. In this situation, the spherical bearing 301 absorbs the shear load instead of bearings 209 and 212. Spherical bearing 301 comprises an outer ring 301a and an inner ring 301b, which is captive within outer ring 301a in the axial direction. The outer surface of inner ring 301b and the inner surface of outer ring 301a are spherical and slide against each other, such as with a lubricant, a liner (e.g., polytetrafluoroethylene or PTFE, or a race of ball-bearings. In some embodiments, an anti-rotation feature forces inner ring 301b to be constrained rotationally to the mast 204 and/or mast sleeve 302 to reduce wear.

During normal tilt-rotor operations, such as during VTOL and airplane modes, spherical bearing 301 floats on the mast sleeve 302, and mast sleeve 302 is fixed to mast 204. Spherical bearing 301 is free to rotate about the axis of mast 204 and translate parallel to the mast axis as the hub assembly 201 flaps. Once the hub assembly 201 is locked, spherical bearing 301 becomes the most direct load path from yoke 202 to mast 204 so hub forces (besides torque) forces are not transferred into needle bearings 209 or 212.

Spherical bearing 301 floats within an adapter sleeve 218 that fits inside Hooke's joint 205. Adapter sleeve 218 has one or more mounting tabs 219 that are adapted to be coupled to mounting tabs 220 on pillow blocks 211 of hub extension 213. Accordingly, when hub assembly 201 is locked out by hub lock 215, any force on a rotor blade creates a moment or torque on spindles 203 and yoke 202. This torque is passed to hub extension 213 on which spindles 203 and yoke 202 are mounted. Hub extension 213 then passes the torque to adapter sleeve 218 and spherical bearing 301, which passes the load to mast 204. This load path avoids the needle bearings 209 and 212 and reduces wear on those components.

The outer ring 301a of spherical bearing 301 is attached to adapter sleeve 218 and mast 204 can float or slide within inner ring 301b, such as along a mast sleeve 302. Alternatively, inner ring 301b may be attached to mast 204, and outer ring 301a may float or slide within adapter sleeve 218.

This configuration switches the load input to mast 204 between two paths. During VTOL and airplane mode, needle bearings 209 and 212 carry the load. During jet mode or when the hub assembly 201 is locked, bearings 209 and 212 are offloaded and spherical bearing 301 is loaded. The use of spherical bearing 301 in a single Hooke's joint gimbal assembly would also be useful if shear forces were being created by other sources, such as if the hub assembly was out of balance and created a shear load.

Various materials may be used for spherical bearing 301. For example, spherical bearing 301 may be a metallic/ceramic style bearing in one embodiment or may be an elastomeric "spherical" style of bearing in other embodiments. In configurations employing a metallic/ceramic spherical bearing, the bearing may translate up/down on mast sleeve 302 when the hub assembly 201 is flapped. When an elastomeric bearing is used as spherical bearing 301, in some configurations the bearing 301 may slide on mast sleeve 302 during flapping. In other configurations, an elastomeric bearing 301 may be fixed on both ends (i.e., fixed to adapter sleeve 218 and to mast 204) because of the ability of elastomerics to deflect. An elastomeric bearing may require a larger space, but the need for a mast wear sleeve 204 would be eliminated. Additionally, an elastomeric bearing 301 would reduce part replacement activity due to wear and may reduce design complexity.

FIG. 4 is a perspective view of a hub assembly 401 according to an alternate embodiment. FIG. 5 is a cross-section view of hub assembly 401. Hub assembly 401 comprises a yoke 402 having three arms to which rotor blades can be coupled using spindles 403. A mast 404 transmits torque from an engine to hub assembly 401 using a Hooke's joint 405, which allows for hub assembly flapping. Hooke's joint 405 is coupled to mast driver member 406 by needle bearings 407. Hooke's joint 405 is also coupled to pillow blocks 408 by needle bearings 409. Pillow blocks 408 are attached to the bottom side of yoke 402 and spindles 403. Bearings 407 and 409 transfer loads from hub assembly 401 to mast 404 during flapping.

A gimbal lock extension 410 is mounted on top of yoke 402 and spindles 403 and has an open center section 411 that is adapted to receive a hub lock component (not shown). The design of hub assembly 401 differs from hub assembly 201 (FIGS. 2A and 2B) in part because gimbal lock extension 410 is a separate component and is not directly attached to pillow blocks 408. When the hub lock component is lowered into center section 411, the hub assembly 401 is still capable of rotating with mast 404 but is no longer capable to flapping. The hub assembly 401 may be locked, for example, to allow rotor blades mounted on yoke 402 and spindles 403 to be folded during jet mode.

Referring to FIG. 5, a spherical bearing 501 couples hub assembly 401 to mast 404. Spherical bearing 501 floats within an adapter sleeve 412 that fits inside Hooke's joint 405. Adapter sleeve 412 has one or more mounting tabs 502 that are adapted to be coupled to mounting tabs 503 on pillow blocks 408.

Spherical bearing 501 couples hub assembly 401 to mast 404 and provides a direct path to mast 404 if shear loads are applied when hub assembly 401 is locked out to prevent flapping. In this situation, the spherical bearing 501 absorbs the shear load instead of bearings 407 and 409. Accordingly, during normal tilt-rotor operations, such as during VTOL and airplane modes, spherical bearing 501 floats on mast 404 and does not support the torque loads in hub assembly 401. However, once the hub assembly 401 is locked, spherical bearing 501 provides a direct load path from yoke 402 to mast 404, thereby allowing any shear forces to bypass needle bearings 407 and 409.

During VTOL and airplane mode, needle bearings 407 and 409 carry the load in hub assembly 401. During jet mode or when hub assembly 401 is locked out, any force on a rotor blade creates a moment or torque on spindles 403 and yoke 402. This torque is passed to pillow blocks 408 and then to adapter sleeve 412, which passes the load to spherical bearing 501 and then to mast 404. This load path avoids the needle bearings 407 and 409 and reduces wear on those components.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A rotor hub assembly, comprising:
a yoke configured to attach rotor blades thereto;
a pair of pillow blocks attached to the yoke;
a single Hooke's joint configured to attach to, and transmit forces between, a mast and the yoke;
a first pair of trunnions on the one Hooke's joint, the first pair of trunnions coupled to the pillow blocks;
a mast driver attached to the mast;
a second pair of trunnions on the one Hooke's joint, the second pair of trunnions coupled to the mast driver; and
a bearing coupled between the yoke and the mast.

2. The rotor hub assembly of claim 1, wherein the bearing comprises a spherical bearing having an inner ring surrounding the mast and an outer ring coupled to the yoke.

3. The rotor hub assembly of claim 1, wherein the bearing comprises an elastomeric bearing that is coupled to the yoke and that surrounds the mast.

4. The rotor hub assembly of claim 1, further comprising:
two pillow blocks configured to couple the one Hooke's joint to the yoke; and
an adapter sleeve attached to the pillow blocks and positioned to surround a spherical bearing, wherein the adapter sleeve extends between the one Hooke's joint and the mast.

5. The rotor hub assembly of claim 4, wherein the adapter sleeve and pillow blocks are integrally formed from a single piece.

6. The rotor hub assembly of claim 1, further comprising:
a gimbal lock attached to the yoke, the gimbal lock configured to prevent gimballing of the yoke when engaged.

7. The rotor hub assembly of claim 1, further comprising:
bearings coupled between each trunnion and the corresponding pillow block or mast driver.

8. The rotor hub assembly of claim 1, further comprising:
an adapter sleeve attached to the pillow blocks and positioned to surround a spherical bearing, the adapter sleeve extending between the one Hooke's joint and the mast.

9. The rotor hub assembly of claim 8, wherein the adapter sleeve and pillow blocks are integrally formed from a single piece.

10. The rotor hub assembly of claim 1, further comprising:
a gimbal lock attached to the yoke, the gimbal lock configured to prevent gimballing of the yoke when the gimbal lock is engaged.

11. The rotor hub assembly of claim 10, wherein the gimbal lock and pillow blocks are integrally formed from a single piece.

12. A tiltrotor aircraft, comprising:
a fuselage;
a wing having a first end attached to the fuselage;
a rotor system coupled to a second end of the wing, the rotor system configured to move between a vertical orientation and a horizontal orientation during operation, the rotor system comprising:
a yoke configured to attach a plurality of rotor blades thereto;
a pair of pillow blocks attached to the yoke;
a single Hooke's joint configured to attach to, and transmit forces between, a mast and the yoke; and
a first pair of trunnions on the one Hooke's joint, the first pair of trunnions coupled to the pillow blocks;
a mast driver attached to the mast;
a second pair of trunnions on the one Hooke's joint, the second pair of trunnions coupled to the mast driver; and
a bearing coupled between the yoke and the mast.

13. The tiltrotor aircraft of claim 12, wherein the bearing comprises a spherical bearing having an inner ring surrounding the mast and an outer ring coupled to the yoke.

14. The tiltrotor aircraft of claim 12, wherein the bearing comprises an elastomeric bearing that is coupled to the yoke and that surrounds the mast.

15. The tiltrotor aircraft of claim 12, further comprising:
an adapter sleeve attached to the pillow blocks and positioned to surround a spherical bearing, the adapter sleeve extending between the one Hooke's joint and the mast.

16. The tiltrotor aircraft of claim 12, further comprising:
a gimbal lock attached to the yoke, the gimbal lock configured to prevent gimballing of the yoke when the gimbal lock is engaged.

17. The tiltrotor aircraft of claim 16, wherein the rotor blades are configured to move between an extended position and a folded position while operating in the horizontal orientation and with the gimbal lock engaged.

18. The tiltrotor aircraft of claim 16, wherein a spherical bearing is configured to transfer shear loads from the yoke to the mast when the gimbal lock is engaged and when gimballing forces are applied to one or more of the rotor blades.

* * * * *